(12) United States Patent
Lu

(10) Patent No.: US 7,167,163 B2
(45) Date of Patent: Jan. 23, 2007

(54) HIDDEN TOUCH PAD STRUCTURE

(75) Inventor: Ying-Ta Lu, Taipei (TW)

(73) Assignee: First International Computer Inc., Taipei (TW)

( * ) Notice: Subject to any disclaimer, the term of this patent is extended or adjusted under 35 U.S.C. 154(b) by 495 days.

(21) Appl. No.: 10/792,845

(22) Filed: Mar. 5, 2004

(65) Prior Publication Data

US 2005/0195172 A1    Sep. 8, 2005

(51) Int. Cl.
*G09G 5/00* (2006.01)
*G06F 1/16* (2006.01)
*F21V 7/04* (2006.01)

(52) U.S. Cl. .............. 345/173; 178/18.03; 178/18.11; 348/14.03; 362/26; 362/29; 362/612; 361/683; 463/37

(58) Field of Classification Search ............... 345/173, 345/175, 176, 178, 901, 905, 962; 178/18.03, 178/18.08–18.11; 348/14.03; 361/683; 362/26, 29, 600, 602, 610–613
See application file for complete search history.

(56) References Cited

U.S. PATENT DOCUMENTS

| | | | | |
|---|---|---|---|---|
| 5,736,686 A | * | 4/1998 | Perret et al. | 178/18.11 |
| 6,788,295 B1 | * | 9/2004 | Inkster | 345/175 |
| 6,933,929 B1 | * | 8/2005 | Novak | 345/173 |
| 6,956,561 B1 | * | 10/2005 | Han | 345/170 |
| 2003/0227766 A1 | * | 12/2003 | Hom et al. | 362/23 |

* cited by examiner

*Primary Examiner*—Henry N. Tran
(74) *Attorney, Agent, or Firm*—Troxell Law Office, PLLC

(57) ABSTRACT

A hidden touch pad structure adopted for an electronic product has a plate, a touch pad arranged inside the plate, a circuit board disposed under and retained against the plate and the touch pad simultaneously, and a lighting device surrounding the touch pad and received inside the plate. The circuit board receives a pressure signal via the plate and the touch pad, and drives the lighting device to provide light. The touch pad is recognized via the lighting device surrounding thereof.

8 Claims, 2 Drawing Sheets

HIDDEN TOUCH PAD STRUCTURE

BACKGROUND OF THE INVENTION

1. Field of the Invention

The present invention relates to a touch pad, and particularly relates to a hidden touch pad structure adopted for an electronic product.

2. Background of the Invention

With respect to FIG. 1 and 1A, a conventional lap top 1*a* with a touch pad 2*a* includes a base 10*a*, a cover 11*a* pivoted on an edge of the base 10*a* and a plate 12*a* disposed on an upper surface of the base 10*a*. The touch pad 2*a* is arranged between the plate 12*a* and the base 10*a*, and is partially revealed via a window formed in the plate 12*a*. The window in plate 12*a* is configured corresponding to the touch pad 2*a*. The plate 12*a* has a pressing member 121*a* inwardly extending from an outline of the window to press and retain against the touch pad 2*a*. The touch pad 2*a* has a lower surface aligned with that of the plate 12*a* for connecting a circuit board 12*a* arranged thereunder. The touch pad 2*a* electrically connects the circuit board 3*a*, and the exposed part of the touch pad 2*a* can sense user's finger effectively via the circuit board 3*a* to transfer and transmit signals therefrom. Generally speaking, the plate 12*a* has a thickness, of between 3 mm and 4 mm, greater than that of the touch pad 2*a*. To avoid height differences between the plate 12*a* and the touch pad 2*a* influencing the feeling of user's finger, the pressing member 121*a* has a smoothing surface 122*a* formed on a free end thereof. The smoothing surface 122*a* includes a graded curvature for smoothing touching.

However, the plate 12*a* with the window, the pressing member 121*a* and the smoothing surface 122*a* are manufactured by multiple steps, so as to increase costs and to reduce manufacturing efficiency. Furthermore, the pressing member 121*a* may be improperly long and reduce the size of the exposed part of the touch pad 2*a*. The pressing member 121*a* may be improperly thick to increase the height differences between the touch pad 2*a* and the plate 12*a*. The smoothing surface 122*a* of plate 12*a* is made within a small length of the pressing member 121*a*, and complicated steps are needed. Accordingly, designs of the pressing member 121*a* smoothing surface 122*a* are made carefully and manufacturing apparatus must be accurate and precise.

In addition, the touch pad 2*a* is opened up for use; a periphery thereof adjacent to the pressing member 121*a* of the plate 12*a* is easily covered with, and the exposed part of the touch pad 2*a* is stained with oil from a user's finger. Both are difficult to clean up and thus affect the long term life of the electronic product.

Hence, an improvement over the prior art is required to overcome the disadvantages thereof.

SUMMARY OF INVENTION

The primary object of the invention is therefore to specify a hidden touch pad structure adopted for an electronic product, in which a plate thereof has a recess formed integrally in one piece to omit other processes and high-precision apparatuses for simplifying steps and reducing costs.

The secondary object of the invention is therefore to specify a hidden touch pad structure adopted for an electronic product, in which the touch pad is hidden under the plate to avoid exposing the touch pad, failure maintenance and reduced product life.

The third object of the invention is therefore to specify a hidden touch pad structure adopted for an electronic product, in which the touch pad is recognized by a lighting device.

The fourth object of the invention is therefore to specify a hidden touch pad structure adopted for an electronic product in which the lighting device strengthens characteristics of a product and builds up a specific brand image, both for commercial trade.

According to the invention, this object is achieved by a hidden touch pad structure adopted for an electronic product and including a plate, a touch pad arranged inside the plate, a circuit board disposed under and retained against the plate and the touch pad simultaneously, and a lighting device surrounding the touch pad and received inside the plate. The circuit board receives a pressure signal via the plate and the touch pad and drives the lighting device to provide light, and the touch pad is recognized via the lighting device surrounding thereof.

To provide a further understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF THE EMBODIMENTS

Figure 2:
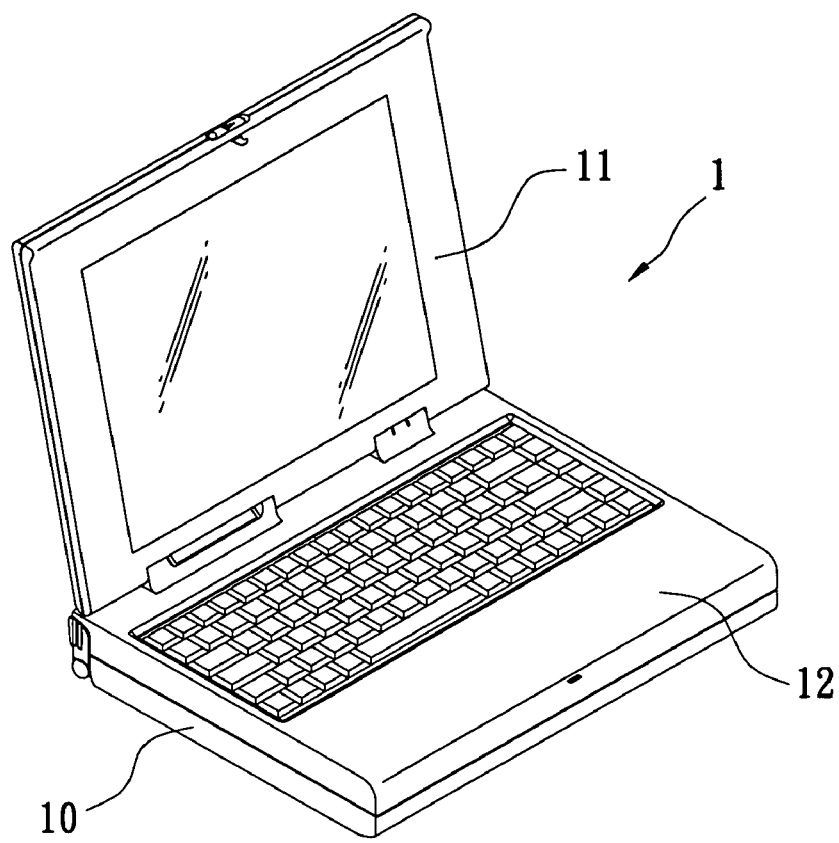
FIG. 2 is a perspective view of a hidden touch pad structure according to the present invention.
Figure 2A:
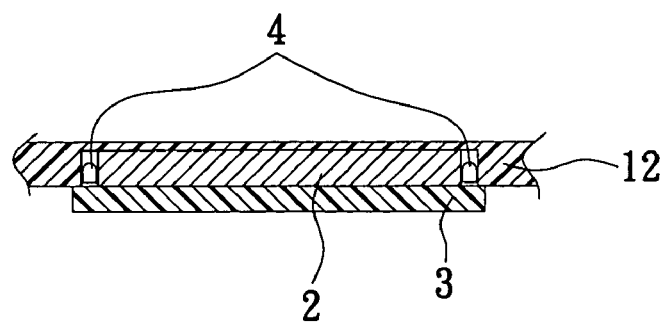
FIG. 2A is a cross-sectional profile of the hidden touch pad structure according to the present invention.

With respect to FIGS. 2 and 2A, the present invention provides a hidden touch pad structure adopted for an electronic product. The electronic product may be a notebook 1, which includes a base 10 and a cover 11 pivoted to an edge of the base 10. The hidden touch pad structure includes a plate 12 disposed on an upper surface of the base 10, a touch pad 2 arranged inside the plate 12, a circuit board 3 disposed under and retained against the plate 12 and the touch pad 2 simultaneously, and a lighting device 4 surrounding the touch pad 2 and receiving inside the plate 12. The touch pad 2 and the lighting device 4 respectively electrically connect to the circuit board 3, whereby the circuit board 3 receives a pressure signal via the plate 12 and the touch pad 2 and drives the lighting device 4 to provide light. The touch pad 2 is recognized via the lighting device 4 surrounding thereof. The plate 12 includes a recess concaved from a bottom surface thereof with a predetermined depth. The recess is formed with the plate 12 integrally in one piece, and the touch pad 2 is disposed in the recess of the plate 12 to omit other processes and high-precision apparatuses in the conventional process for simplifying steps and reducing costs.

The predetermined depth of the recess approaches a thickness of the touch pad 12. The touch pad has a top surface retained against an inner surface, being adjacent to the recess, of the plate thereby. The touch pad 2 contacts the plate 12 well, and accordingly, to press the plate 12 is equivalent to pressing the touch pad 2. In addition, the plate 12 is originally flat and smooth, and needs no further smoothing processes for a smooth feeling. Simultaneously, the plate 12 encloses the touch pad 2 to protect substantially the touch pad 2 and avoid reduced product life due to pollution.

The lighting device 4 electrically connects to the circuit board 3, and the circuit board 3 receives the pressure signal via the plate 12 and the touch pad 2. The circuit board 3 drives the lighting device 4 to provide light; the touch pad 2 is recognized via the lighting device 4 surrounding thereof. The lighting device 4 is amusing for a user. The lighting device 4 includes a lighting member or a guiding member. The lighting device 4 includes a plurality of LEDs (Light Emitting Diode) surrounding sequentially, or the lighting device 4 includes a LED and a guide light strip. Therefore, the lighting device 4 is lightweight, saves power, and has a long life. The hidden touch pad structure according to the present invention contains the touch pad 2 therein due to a various thickness of the plate 12, so as to decrease manufacturing steps. The hidden touch pad structure can be fabricated in a modular manner to improve manufacturing efficiency for all kinds of electronic products. Furthermore, the touch pad 2 is hidden beneath the plate 12 for simplifying visual impressions and providing a smooth touch via the plate 12, and is beneficial for strengthening characteristics of a product and building up a specific brand image, both for commercial trade.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A hidden touch pad structure adopted for an electronic product, comprising:
    a plate having a various thicknesses formed thereon;
    a touch pad arranged inside the plate;
    a circuit board disposed under and retained against the plate and the touch pad, simultaneously; and
    a lighting device surrounding the touch pad and received inside the plate;
    wherein the touch pad and the lighting device respectively electrically connect to the circuit board, whereby the circuit board receives a pressure signal via the plate and the touch pad and drives the lighting device to provide light, and the touch pad is recognized via the lighting device surrounding thereof.

2. The hidden touch pad structure as claimed in claim 1, wherein the plate includes a recess concaved from a bottom surface thereof with a predetermined depth to make the various thickness thereof, the recess is formed on the plate integrally in one piece, and the touch pad is disposed in the recess of the plate.

3. The hidden touch pad structure as claimed in claim 2, wherein the predetermined depth approaches a thickness of the touch pad.

4. The hidden touch pad structure as claimed in claim 2, wherein the touch pad has a top surface retained against an inner surface, being adjacent to the recess, of the plate.

5. The hidden touch pad structure as claimed in claim 1, wherein the lighting device includes a surrounding plurality of LEDs (Light Emitting Diode).

6. The hidden touch pad structure as claimed in claim 1, wherein the lighting device includes a lighting member and a guiding member connecting sequentially.

7. The hidden touch pad structure as claimed in claim 6, wherein the lighting member is an LED (Light Emitting Diode).

8. The hidden touch pad structure as claimed in claim 6, wherein the guiding member is a guide light strip.

* * * * *

UNITED STATES PATENT AND TRADEMARK OFFICE
CERTIFICATE OF CORRECTION

| | | |
|---|---|---|
| PATENT NO. | : 7,167,163 B2 | Page 1 of 1 |
| APPLICATION NO. | : 10/792845 | |
| DATED | : January 23, 2007 | |
| INVENTOR(S) | : Ying-Ta Lu | |

Figure 1:
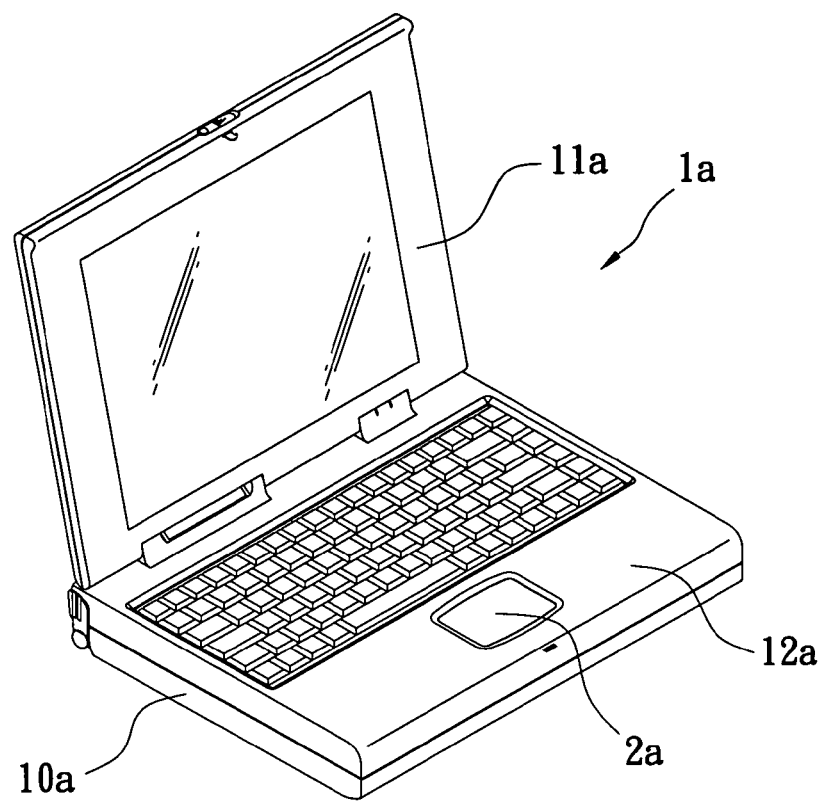
FIG. 1 is a perspective view of a conventional lap top with a touch pad.
Figure 1A:
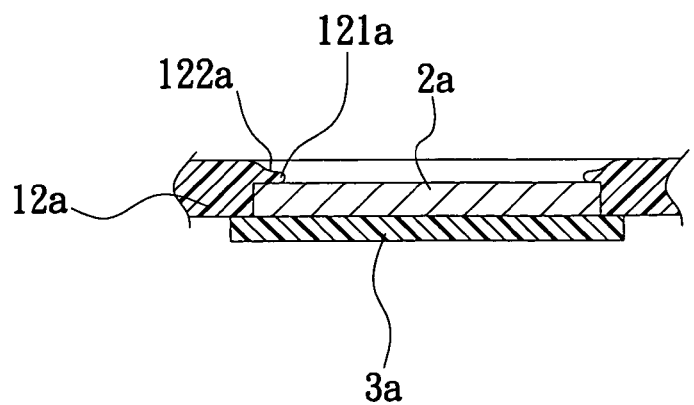
FIG. 1A is a cross-sectional profile of the touch pad adopted for the conventional lap top.

It is certified that error appears in the above-identified patent and that said Letters Patent is hereby corrected as shown below:

Title page, in (57) Abstract, line 9, delete "thereof" and insert --the touch pad--;
Column 1, lines 5 and 6, delete "pad, and particularly" and insert --pad and, particularly,--;
Column 1, line 10, cancel "1A" and substitute therefor --FIG. 1A--;
Column 1, line 21, delete "12a" and insert --13a--;
Column 1, line 23, after "sense" insert --a--;
Column 1, line 28, delete "user's" and insert --a user's--;
Column 1, lines 42 and 43, delete "pressing member 121a smoothing surface 122a are made carefully" and insert --smoothing surface 122a of the pressing member 121a and made carefully,--;
Column 1, lines 45 and 46, delete "; a periphery thereof" and insert --. A periphery--;
Column 1, line 47, delete "with," and insert --with--;
Column 1, lines 66 and 67, delete "failure maintenance and" and insert --to avoid maintenance and to avoid--;
Column 2, line 19, delete "thereof" and insert --the touch pad--;
Column 2, line 23, delete "thus";
Column 2, line 58, delete "receiving" and insert --received--;
Column 2, line 59, delete "respectively" insert --, respectively,--;
Column 2, line 63, delete "thereof" and insert --the touch pad--;
Column 3, line 4, delete "12. The touch pad" and insert --2. The touch pad 12--;
Column 3, line 9, delete "smooth," and insert --smooth--;
Column 3, line 17, delete "; the" and insert --. The--;
Column 3, line 18, delete "thereof" and insert --the touch pad 2--;
Column 4, line 15, delete "thereof" and insert --the touch pad--.

Signed and Sealed this

Thirtieth Day of October, 2007

JON W. DUDAS
*Director of the United States Patent and Trademark Office*